UNITED STATES PATENT OFFICE.

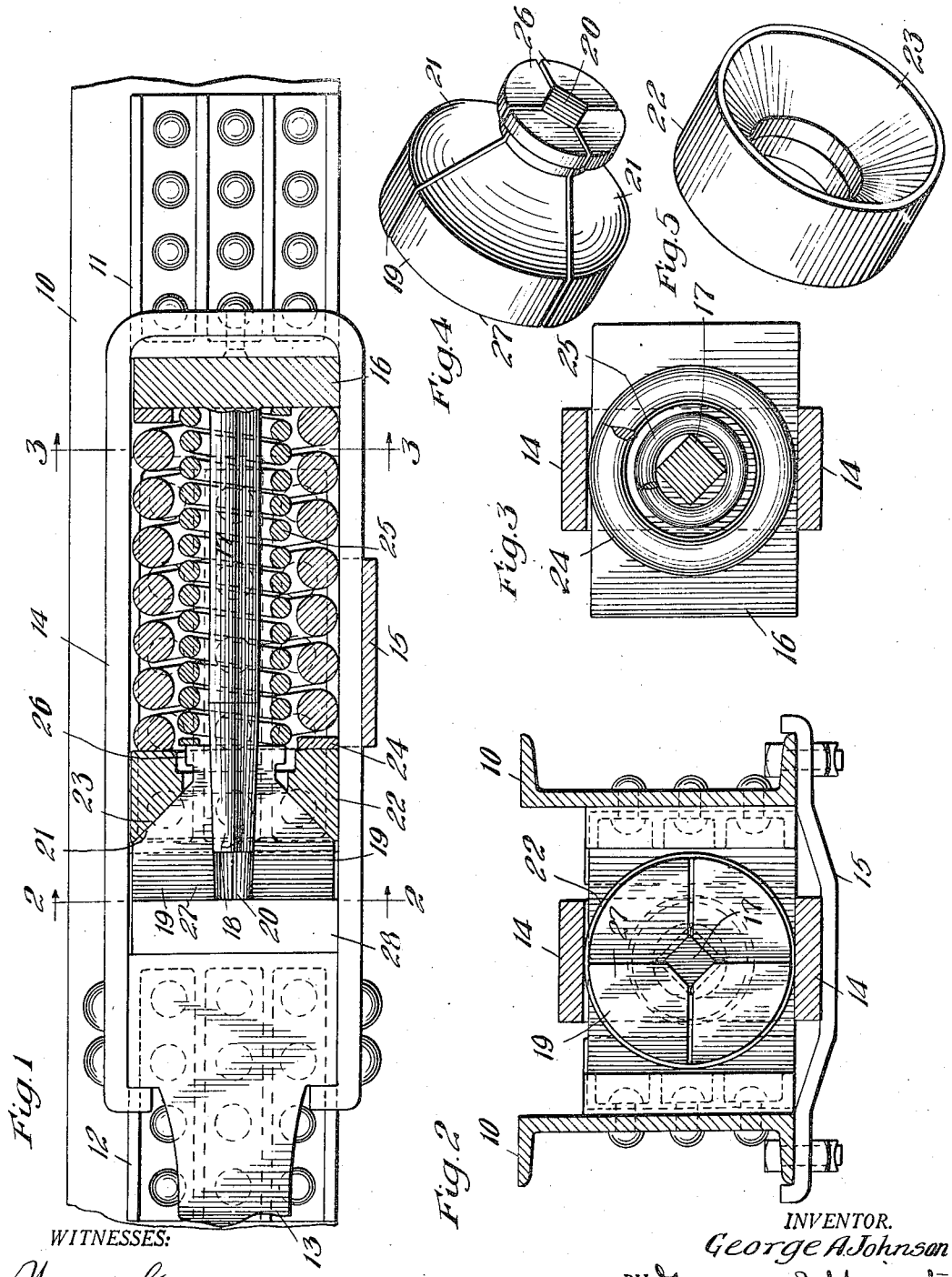

GEORGE A. JOHNSON, OF CHICAGO, ILLINOIS, ASSIGNOR TO WILLIAM H. MINER, OF CHAZY, NEW YORK.

FRICTION-GEAR FOR DRAFT-RIGGING.

1,300,402.          Specification of Letters Patent.          Patented Apr. 15, 1919.

Application filed December 20, 1916. Serial No. 137,933.

*To all whom it may concern:*

Be it known that I, GEORGE A. JOHNSON, a citizen of the United States, residing at Chicago, in the county of Cook and State of Illinois, have invented a certain new and useful Improvement in Friction-Gears for Draft-Rigging, of which the following is a full, clear, concise, and exact description, reference being had to the accompanying drawings, forming a part of this specification.

This invention relates to improvements in friction gears for draft riggings.

One object of the invention is to provide a high capacity friction gear having certain release and in which the use of a friction shell is eliminated.

Another object of the invention is to provide a friction gear having the friction elements thereof so arranged that pressure from the friction shoes is transmitted to a coöperating friction element in a manner to compress the latter instead of placing the latter under tension as has hitherto been customary where friction shells have been employed.

Another object of the invention is to provide a friction gear possessing the characteristics above mentioned and wherein the pressure is applied directly to the friction shoes and in lines parallel to the axis of the gear.

In the drawing forming a part of this specification, Figure 1 is a part elevation, part longitudinal section of a draft rigging showing my improvements in connection therewith. Figs. 2 and 3 are transverse, vertical sectional views taken on the lines 2—2 and 3—3, respectively of Fig. 1. And Figs. 4 and 5 are detail perspectives of the friction shoes and ring employed with my improvement.

In said drawing, 10—10 denote channel, center or draft sills of a car underframe to which are secured rear stops 11 and front stops 12. The draw bar 13 is operatively connected with the gear, hereinafter described, by a yoke 14, the parts being supported by a saddle plate 15.

The friction gear proper, as shown, comprises a rear follower 16 having a forwardly extended, preferably integral center friction post 17, the latter being tapered at its forward end as indicated at 18, for the purpose hereinafter described. Coöperable with said post 17 is a series of circularly arranged friction shoes 19—19, each of the latter being provided with an inner, longitudinally extending, groove 20 tapered to correspond with the tapered portion 18 of the post. Each of said shoes 19 is also provided on its outer face with a conical wedging surface 21, said surfaces 21, when the friction shoes are assembled, corresponding to the surface of a frusto-cone. Coöperable with all of the friction shoes is a ring 22 having a corresponding interior, conical wedging surface 23 which engages said surfaces 21. As clearly shown in the drawing, the ring 22 is located on the inner side of the friction shoes and surrounds the inner ends of the latter. On its rear face the ring 22 is engaged by the outer, heavy coil 24 of the spring of the gear, the other end of said coil bearing against said follower 16. The inner coil 25 of the spring bears against said follower 16 at its rear end and against the inner ends 26 of the friction shoes. The outer ends 27 of the friction shoes bear directly against the front follower 28.

In operation, upon inward movement of the draw bar, pressure is transmitted from the follower 28 in lines parallel to the axis of the gear directly to the friction shoes 19. As the latter travel inwardly, they are forced outwardly or radially due to the tapered section 18 of the post. This movement is resisted by the ring 22 and consequently the latter is forced inwardly at a slightly greater speed than the inward movement of the friction shoes, in this manner causing a differential action between the friction shoes and the ring. The ring is, of course, resisted by the spring coil 24 and the friction shoes are also resisted by the inner coil 25. At the end of the inward movement and upon removal of the pressure against the shoes, it is apparent that the friction shoes will be immediately released due to the action of the springs against the ring and the friction shoes and the direction of the taper on the friction post. The operation in draft will be apparent from the foregoing description of the buffing action.

By means of my arrangement, I am enabled to employ a relatively acute angle between the friction shoes and the friction post, thereby obtaining high capacity while at the same time, the tapered post insures the positive release of the friction elements at the end of the compressive movement.

Furthermore, by employing the ring 22 and locating the same at the inner ends of the friction shoes in the manner described, I am enabled to eliminate the use of a friction cylinder, thus materially decreasing the cost of the gear as compared with other types where friction shells are employed.

In the drawing, I have illustrated four shoes and a center post rectangular in cross section, but it will be apparent to those skilled in the art that the number of friction shoes may be varied and also the shape of the center post correspondingly varied. I also contemplate all other changes and modifications that come within the scope of the claims appended hereto.

I claim:

1. In a friction shock absorbing mechanism, the combination with a friction post, of a plurality of friction shoes disposed around and frictionally engaging said post, said shoes having exterior wedge faces, a spring directly engaging the inner ends of said shoes to assist in resisting movement thereof, wedging means for holding said shoes in operative relation with said post, and a spring engaging said wedging means, said inner ends of said shoes being extended lengthwise of said post and within said wedging means.

2. In a friction shock absorbing mechanism, the combination with a follower having a friction post extending therefrom, said post having a tapered portion at its end, of a plurality of friction shoes surrounding said post and frictionally engaging said tapered portion, said shoes having exterior wedge surfaces, a ring surrounding the inner ends of said shoes and having a wedging surface coöperable with the wedging surfaces of the shoes, and spring means directly resisting movement of said ring and also said shoes relatively to the post, the inner ends of said shoes and the inner spring-engaged end of said ring being normally substantially flush.

In witness that I claim the foregoing I have hereunto subscribed my name this 16th day of Dec. 1916.

GEORGE A. JOHNSON.